United States Patent [19]

Maday

[11] 3,913,196

[45] Oct. 21, 1975

[54] ROTARY CUTTING TOOL

[75] Inventor: Arthur E. Maday, Bay City, Mich.

[73] Assignee: Lear Siegler, Inc., Bridgeport, Mich.

[22] Filed: Aug. 29, 1974

[21] Appl. No.: 501,777

[52] U.S. Cl. .............. 29/103 A; 144/219; 145/130; 408/230
[51] Int. Cl.² .......................................... B26D 1/12
[58] Field of Search .......... 29/103 A, 567; 144/218, 144/219, 240, 221; 145/130; 408/230

[56] References Cited
UNITED STATES PATENTS

| | | | |
|---|---|---|---|
| 335,309 | 2/1886 | Rendall | 144/218 |
| 1,630,602 | 5/1927 | Blanco | 29/103 A |
| 2,623,552 | 12/1952 | Compton et al. | 145/130 |
| 3,058,199 | 10/1962 | Cave et al. | 29/103 A |
| 3,327,749 | 6/1967 | Hunn | 145/130 |

Primary Examiner—Leonidas Vlachos
Attorney, Agent, or Firm—Learman & McCulloch

[57] ABSTRACT

A rotary cutting tool, such as a router, especially adapted for cutting fibrous materials cleanly comprises a cylindrical body having a first group of cutting edges extending helically in a direction from one end of the body toward the other and a second group of cutting edges extending helically in a direction from the other end of the body toward the first group of cutting edges, both groups of cutting edges terminating at a zone of confrontation of the two groups. The helices of the two groups of cutting edges are of opposite hand so that the two groups of cutting edges form a herringbone pattern. The body has diametrally opposite flutes which traverse both groups of cutting edges. The confronting cutting edges of the respective groups at the zone of confrontation are axially staggered. Each cutting edge has a rake and is undercut, as a consequence of which each cutting edge has a hook-like configuration in cross-section.

12 Claims, 8 Drawing Figures

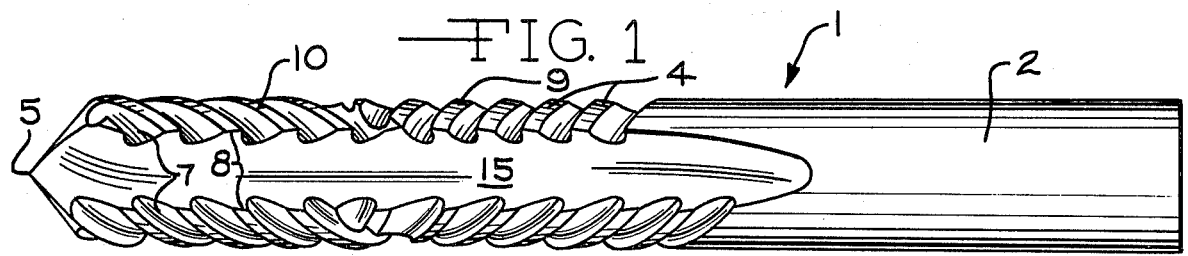
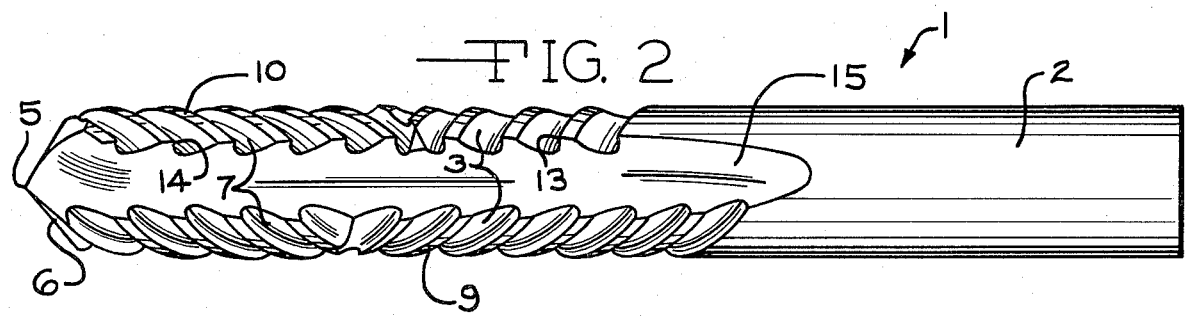
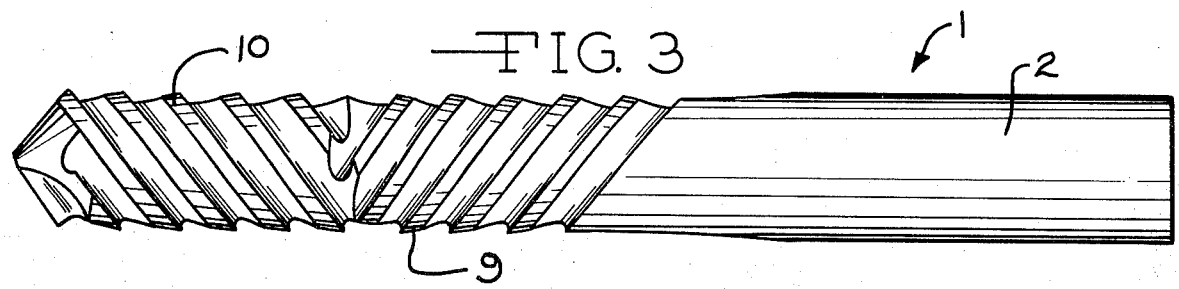
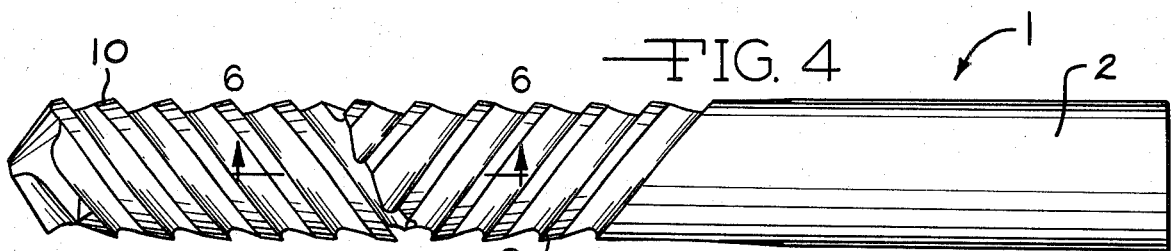
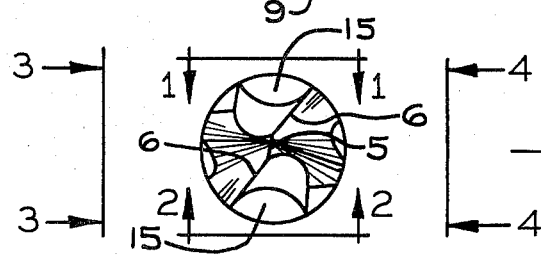

ROTARY CUTTING TOOL

The use of plastics materials for such purposes as paneling, helmets, decorative members, and the like is quite common. Some kinds of plastics materials can be cut to shape with conventional routers and the edges of the cut material will be smooth. Other plastics materials cannot be cut with conventional routing tools, however, because such tools cannot provide a smooth edge on the cut material. For example, some plastics materials are formed from individual strands which are woven like textiles and built up into a mat with either a loose or tight weave. When materials of these kinds are cut with a conventional routing tool, the cut edges are frayed and unsightly, thereby necessitating subsequent trimming operations. The requirement that such materials be subjected to two operations makes the use of such materials more expensive than would be the case if cutting and trimming could be performed in one operation.

The principal object of the invention is to provide a rotary cutting tool such as a router which is capable of cutting numerous kinds of materials, including woven strands of plastics material, and providing a smooth surface on the edges of the cut materials.

The foregoing objective is achieved by the utilization of a rotary, cylindrical tool body having two groups of helical cutting edges which extend in directions from opposite ends of the body toward one another along helices of opposite hand and form a general herringbone configuration. At the zone of confrontation of the cutting edges the confronting cutting edges are staggered axially of the tool body. When the tool is used in the cutting of a piece of material, the zone of confrontation of the tool body occupies a position at substantially the middle of the material so that, when the tool is rotated, the cutting edges on opposite sides of the zone of confrontation cut the material with a shearing action that draws the fibers from the opposite sides of the material toward the middle for cutting by the confronting ends of the cutting edges. The axial staggering of the confronting ends prevents the formation of a ridge along the edge of the material.

Other objects and advantages of the invention will be pointed out specifically or will become apparent from the following description when it is considered in conjunction with the appended claims and the accompaning drawings, wherein:

FIGS. 1 - 4 are elevational views of a tool constructed according to the invention; the views being taken along the lines indicated by the correspondingly numbered arrows of FIG. 5;

FIG. 5 is an end view of the tool;

Figure 6:
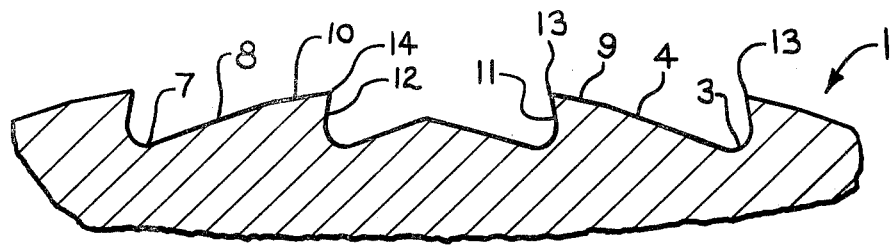
FIG. 6 is an enlarged, longitudinal sectional view taken along the line 6—6 of FIG. 4.

A rotary tool constructed in accordance with the invention comprises a generally cylindrical, preferably carbide steel body 1 having a smooth shank 2 at one end that is adapted to be fitted into the chuck of a driver (not shown) which is capable of rotating the body about its longitudinal axis. At a point between its opposite ends the body is ground to provide alternating helical grooves 3 and lands 4 which spiral from the shank end toward the opposite at a uniform pitch of 60°, for example.

That end of the body 1 opposite the shank 2 may have a drill point 5 and cutting teeth 6. Alternatively, the body could have milling teeth or, if desired, a flat surface at that end opposite the shank. In any case, the body is ground to form alternating helical grooves 7 and lands 8 which spiral in a direction toward the shank end of the body at a pitch corresponding to the pitch of the lands 4.

As disclosed in FIG. 1, the helices of the lands 4 and 8 are of opposite hand. That is, the lands 4 spiral counterclockwise whereas the lands 8 spiral clockwise.

The lands 4 and 8 confront one another at a zone Z substantially midway between the grooved portion of the body. The grooves 3 and 7 join one another at the zone Z, and the width of each groove 3 and 7 is so selected that none of the lands actually intersects. Instead, a gap exists between the confronting lands. The lands do extend, however, along the lines which, if extended, would intersect at the aforementioned zone. This zone hereinafter will be referred to as the zone of confrontation.

The outermost surface of each land 4 is ground at an angle of about 7° to provide a rake 9 and each land 8 is ground to provide a similar rake 10. Each land 4 is undercut as at 11 and each land 8 is similarly undercut as at 12. The lands 4 and 8 thus form cutting edges 13 and 14, respectively, of generally hook-like configuration in crossection (see FIG. 6).

The tool body 1 is provided with one or more axially extending flutes 15 of greater depth than the depth of the grooves 3 and 7 and which traverse both groups of cutting edges. In the disclosed embodiment, there are two diametrally opposite flutes 15, but fewer or more flutes may be provided.

Those ends of the cutting edges 13 and 14 which occupy the zone of confrontation are staggered axially of the body. The gap between adjacent confronting cutting edges thus spirals about the body at the zone Z to such an extent that, as the body rotates, the succeeding cutting edges will traverse a portion of the gap between the preceeding confronting edges. The total extent of the stagger or longitudinal offset between the cutting teeth is so selected that it is at least as great as the gap between the adjacent cutting edges 13 and 14.

Figure 7:
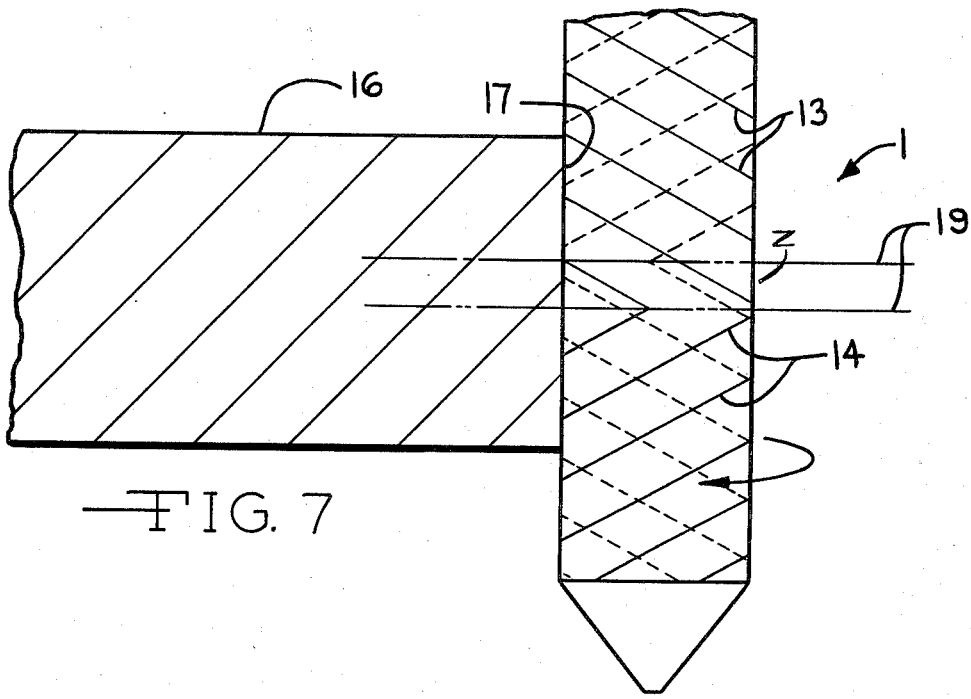
FIG. 7 is a diagrammatic side elevational view illustrating the manner of use of the tool.
Figure 8:
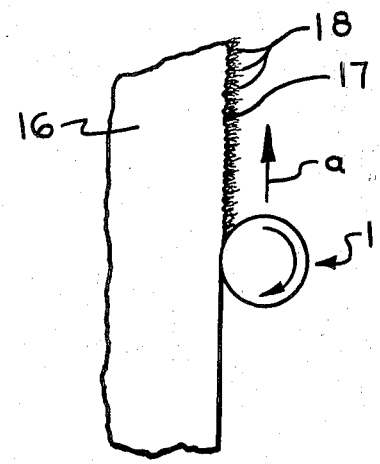
FIG. 8 is a diagrammatic top plan view of the manner in which the tool is used.

The manner of use of the tool is indicated in FIGS. 7 and 8. A sheet 16 of plastics or other material having a thickness less than the combined length of the two groups of cutting edges 13 and 14 is to be cut. For purposes of illustration, the sheet 16 is shown as having an edge 17 from which strands 18 of material extend. It will be understood, however, that the tool body 1 is capable of being plunged into a sheet of material and then moved transversely of the latter so as to cut the sheet into two pieces.

In the tool body diagrammatically shown in FIG. 7, the zone Z of confrontation between the groups of cutting edges 13 and 14 is defined by horizontal lines 19. The body 1 is placed against the edge 17 so that the center of the zone of confrontation lies along the center of the edge 17. With the body 1 held against the edge 17, the body is rotated clockwise, as viewed in FIG. 8, and moved transversely along the edge 17 as is indicated by the arrow a of FIG. 8. As the body rotates, the cutting edges 13 will shear the strands 18 with an action that tends to draw the strands toward the center of the edge 17. The cutting edges 14 also will shear the strands with an action that tends to draw them toward the center of the edge 17. Those strands adjacent the center of the zone of confrontation are subjected to shearing forces first in one direction and then in the opposite direction. The axial staggering of the confronting ends of the cutting edges prevents the formation of the ridge at the center of the edge 17.

The undercutting of the cutting edges of the tool to form the aforementioned hook-like configuration promotes shearing of the strands cleanly, expecially at rotary speeds of 35,000 R.P.M., thereby avoiding fraying of the strands. The undercutting of the cutting edges does not appear to have an adverse effect on the use of the tool for cutting materials which are not stranded.

The number and length of cutting edges with which a cutting tool constructed accorded to the invention is provided will depend upon several factors such as the thickness of the material to be cut, the composition of such material, and the like. These factors may be applied empirically in a given case.

The disclosed embodiment is representative of a presently preferred form of the invention, but is illustrative rather than definitive thereof. The invention is defined in the claims.

What is claimed is:

1. A rotary cutting tool comprising a cylindrical body having opposite ends; a first group of cutting edges formed on and extending helically about said body in a direction from one end of said body toward its other end, said cutting edges being spaced by grooves and all of the cutting edges of said first group terminating at a zone short of said other end of said body; and a second group of cutting edges formed on and extending helically about said body in a direction from said other end toward said one end, said cutting edges of said second group being spaced by grooves and all of the cutting edges of said second group terminating at said zone and confronting the cutting edges of said first group, said groups of cutting edges being formed on helices of opposite hand, each of the cutting edges of said first group terminating short of intersection with a cutting edge of said second group, whereby the confronting ends of the cutting edges of said groups are spaced by a gap at said zone, said gap spiraling about said body at said zone.

2. A tool according to claim 1 including at least one axially extending flute in said body traversing both of said groups of cutting edges.

3. A tool according to claim 1 including a pair of diametrally opposite, axially extending flutes in said body traversing both of said groups of cutting edges.

4. A tool according to claim 1 wherein each of said cutting edges is undercut whereby each of said cutting edges has a hook-like configuration in cross-section.

5. A tool according to claim 1 wherein both of said groups of cutting edges are formed on helices having substantially the same pitch.

6. A tool according to claim 1 wherein said pitch is substantially 60°.

7. A tool according to claim 1 wherein each of said cutting edges is undercut whereby each of said cutting edges has a hook-like configuration in cross-section, and wherein said body has a pair of diametrally opposite, axially extending flutes therein traversing both of said groups of cutting edges.

8. A tool according to claim 7 wherein each of said flutes has a depth greater than the groove between said cutting edges.

9. A tool according to claim 1 wherein said body has cutting teeth at one end, the cutting edges of one of said groups of cutting edges extending from said cutting teeth to said zone.

10. A tool according to claim 9 wherein said body has a mounting shank at that end of said body opposite said cutting teeth.

11. A tool according to claim 1 wherein each of said cutting edges comprises a land surface flanked by a pair of said grooves, said grooves extending into said zone thereby preventing actual intersection of the cutting edges of said groups.

12. A tool according to claim 11 wherein each of said land surfaces has a rake.

* * * * *